US012706336B2

(12) United States Patent
Favaretto

(10) Patent No.: US 12,706,336 B2
(45) Date of Patent: Aug. 11, 2026

(54) VEHICULAR BATTERY PACK AND RELATED ASSEMBLY METHOD

(71) Applicant: FERRARI S.P.A., Modena (IT)

(72) Inventor: Fabrizio Favaretto, Modena (IT)

(73) Assignee: FERRARI S.P.A., Modena (IT)

( * ) Notice: Subject to any disclaimer, the term of this patent is extended or adjusted under 35 U.S.C. 154(b) by 337 days.

(21) Appl. No.: 18/609,146

(22) Filed: Mar. 19, 2024

(65) Prior Publication Data

US 2024/0322305 A1 Sep. 26, 2024

(30) Foreign Application Priority Data

Mar. 21, 2023 (IT) ........................ 102023000005292

(51) Int. Cl.

*H01M 50/112* (2021.01)
*B60K 1/04* (2019.01)
*B60L 50/60* (2019.01)
*B60L 50/64* (2019.01)
*H01M 10/04* (2006.01)

(52) U.S. Cl.

CPC ............. *H01M 50/112* (2021.01); *B60K 1/04* (2013.01); *B60L 50/64* (2019.02); *B60L 50/66* (2019.02); *H01M 10/0431* (2013.01); *B60K 2001/0438* (2013.01); *H01M 2220/20* (2013.01)

(58) Field of Classification Search

CPC ............ H01M 10/0431; H01M 50/112; B60K 2001/0438; B60K 2001/0416; B60L 50/64; B60L 50/66

See application file for complete search history.

(56) References Cited

U.S. PATENT DOCUMENTS 4,346,151 A * 8/1982 Uba .................... H01M 50/325 429/94
6,051,336 A * 4/2000 Dougherty ........ H01M 10/0431 429/149
6,255,015 B1 7/2001 Corrigan et al.
7,547,487 B1 6/2009 Smith et al.
(Continued)

FOREIGN PATENT DOCUMENTS

CN 107546405 A * 1/2018 .......... H01M 10/663
DE 102021122486 A1 3/2023

OTHER PUBLICATIONS

Italian Search Report for Application No. 202300005292; Filing Date: Mar. 21, 2023; Date of Mailing: Sep. 28, 2023; 8 pages.

*Primary Examiner* — Jeffrey J Restifo
(74) *Attorney, Agent, or Firm* — CANTOR COLBURN LLP

(57) ABSTRACT

A vehicular battery pack comprising a three-dimensional substrate arranged within the housing and provided with a plurality of seats, which extend on the inside of the substrate; a plurality of active primary units; wherein each primary unit is entirely inserted in a respective seat; wherein each seat has a shape that is complementary to the one of each primary unit; the battery pack further comprising a first closure assembly, which closes said plurality of primary units inside the respective seats; wherein the closure assembly comprises a plurality of first closure elements, which are electrically conductive and are each arranged in the area of a respective opening; wherein the first terminal is electrically in contact with the respective first closure element of the respective seat.

15 Claims, 4 Drawing Sheets

(56) References Cited

U.S. PATENT DOCUMENTS

| | | | | |
|---|---|---|---|---|
| 7,951,477 | B2 * | 5/2011 | Wood | B60L 50/66 429/185 |
| 8,871,371 | B2 * | 10/2014 | Song | H01M 10/615 429/120 |
| 8,920,955 | B1 * | 12/2014 | Chuang | H01M 10/653 429/7 |
| 9,151,545 | B2 * | 10/2015 | Soukhojak | F28D 15/0266 |
| 9,178,188 | B2 * | 11/2015 | Lim | H01M 50/538 |
| 9,209,483 | B2 * | 12/2015 | Fuhr | H01M 50/20 |
| 9,240,575 | B2 * | 1/2016 | Kanata | H01M 50/112 |
| 9,548,477 | B2 * | 1/2017 | Asaida | H01M 50/119 |
| 9,614,263 | B2 * | 4/2017 | Yang | H01M 10/659 |
| 10,103,414 | B2 * | 10/2018 | Mastrandrea | B60L 50/60 |
| 2009/0139781 | A1 * | 6/2009 | Straubel | B60L 53/14 701/22 |
| 2010/0143773 | A1 | 6/2010 | Honbou | |
| 2015/0221904 | A1 * | 8/2015 | Frutschy | H01M 10/6554 429/99 |
| 2015/0280185 | A1 | 10/2015 | Lampe-Onnerud et al. | |
| 2018/0069280 | A1 * | 3/2018 | Mastrandrea | H01M 10/625 |
| 2024/0258602 | A1 * | 8/2024 | He | B60L 58/24 |
| 2024/0322305 | A1 * | 9/2024 | Favaretto | B60L 50/66 |
| 2025/0309414 | A1 * | 10/2025 | Biegerl | H01M 10/658 |
| 2025/0329884 | A1 * | 10/2025 | Du | H01M 50/586 |
| 2026/0011885 | A1 * | 1/2026 | Shi | H01M 50/538 |

* cited by examiner

X
Y
Z
D
1
2
3
4
5
6
7
8
9
10
11
12
33
34
35
36

1
2
4
2
7
12
14
36
9
19
35
32
28
8
3
13
27
3

X
Y
Z
9
14
15
16
17
18
19
20
21
22
23
24
25
26
27
28
29
30
31
32
A
D
W,A 16
30
29
14
9
31
18
18
15
27
28
17
19,24
32
32
D
W,A
26
17
19
X
Z
Y
A
17
18
A
17
23
22
21
24
25
20
W

VEHICULAR BATTERY PACK AND RELATED ASSEMBLY METHOD

CROSS-REFERENCE TO RELATED APPLICATIONS

This patent application claims priority from Italian patent application no. 102023000005292 filed on Mar. 21, 2023, the entire disclosure of which is incorporated herein by reference.

TECHNICAL FIELD

The invention relates to power storage systems for the automotive industry and it relates to a vehicular battery pack and to a related assembling method.

In particular, the invention can advantageously, though not exclusively be applied to battery packs for high-performance road vehicles, to which explicit reference will be made in the description below without because of this lacking generality.

PRIOR ART

Lithium batteries, thanks to their high energy density, allow electric drive systems to be more and more implemented in the automotive industry. Lithium polymers, in particular, currently represent, from an electrochemical point of view, the state of the art in the production of high-capacity batteries.

Solutions are known, which involve the interconnection—in series and in parallel—of different cells (generally, with 3.7 V each) in order to reach the desired total voltage and energy density for a vehicular battery pack.

Different types of vehicular battery packs are known, which mainly comprise cylindrical or planar (prismatic or pouch) batteries.

Said battery packs usually consist of a plurality of modules, which are combined with and connected to one another so as to form the battery pack. Each module, in turn, consists of a plurality of cells, whether they are cylindrical or planar cells, each inserted in a suited metal container, usually made of aluminium or steel, also known as can (if it is rigid), which can be cylindrical or prismatic, or pouch (if it is flexible).

The presence of these containers an determines increase in the mass of the battery pack resulting from inactive and heavy materials. Said materials, given the thousands of cells that can make up the battery pack of an electric vehicle, significantly affect the dimensions and the weight of the battery pack and, hence, the performances that the road vehicle can reach on a track.

Furthermore, the modules are usually assembled in series, with standard dimensions, and are subsequently combined so as to fill the battery pack as much as possible, said battery pack being usually located in the area of the floorboard of motor vehicles. This leads to a lack of space optimization, since the battery modules do not enable combinations that follow the sinuous profiles of the body of cars.

Therefore, the dimensions and the weight of the battery pack of a road vehicle need to be optimized, without wasting useful space for the batteries.

Document US2015280185 discloses a multi-core lithium-ion battery comprising a sealed casing and a support member arranged inside the sealed casing. The support member comprises a sealed casing, with a lithium-ion cell region and a shared atmosphere region inside the casing.

DESCRIPTION OF THE INVENTION

The object of the invention is to provide a vehicular battery pack and a related assembly method and a related vehicle, which are at least partially free from the drawbacks described above and, at the same time, are simple and economic to be manufactured and carried out.

According to the invention, there are provided a vehicular battery pack and a related assembly method and a related vehicle as claimed in the independent claims attached hereto and, preferably, in any one of the dependent claims directly or indirectly depending on the independent claims.

The appended claims describe preferred embodiments of the invention and form an integral part of the description.

BRIEF DESCRIPTION OF THE DRAWINGS

The invention will now be described with reference to the accompanying drawings, which show some non-limiting embodiments thereof, wherein.

PREFERRED EMBODIMENTS OF THE INVENTION

Figure 1:
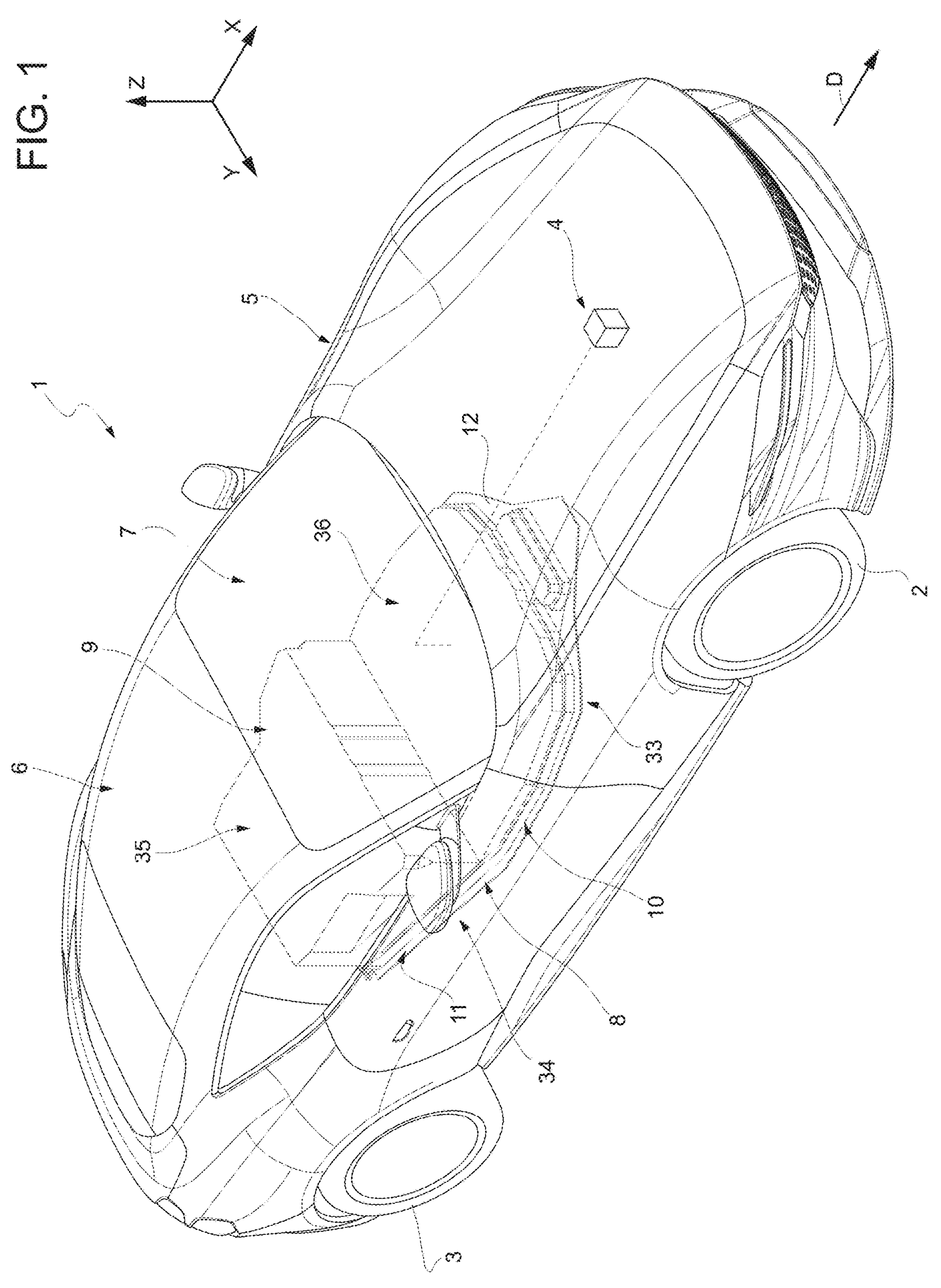
FIG. 1 is a schematic perspective view of an at least partially electric vehicle comprising a battery pack according to the invention.

In FIG. 1, number 1 indicates, as a whole, a road vehicle provided with two front wheels 2 and two rear wheels 3, at least a pair (or all) of them receiving the torque from a powertrain system 4.

The road vehicle 1 is an at least partially electric vehicle (namely, a hybrid or full electric vehicle). In other words, the powertrain system 4 can be a hybrid system (namely, comprising an internal combustion heat engine and at least one electric motor) or an electric system (namely, solely comprising one or more electric motors).

In the figures, the same numbers and the same reference letters indicate the same elements or components with the same function.

For the purposes of the invention, the term “second” component does not imply the presence of a “first” component. As a matter of fact, these terms are only used as labels to improve clarity and should not be interpreted in a limiting manner.

The elements and features contained in the different preferred embodiments, drawings included, can be combined with one another, without for this reason going beyond the scope of protection of this patent application, as described hereinafter.

The road vehicle 1 further comprises a body 5 defining a passenger compartment 6, which is configured to accommodate at least a driver and, if necessary, one or more passengers. The passenger compartment 6 defines at least one cockpit 7 for the driver.

Hereinafter, expressions such as "at the top", "at the bottom", "at the front", "at the back" and others similar to them are used with reference to normal travel conditions of the vehicle 1 along the normal travel direction D.

As shown in the non-limiting embodiment of FIG. 1, it is further possible to define:

a longitudinal axis X integral to the vehicle 1 and, in use, horizontal and parallel to a normal travel direction D of the vehicle 1;

a transverse axis X integral to the vehicle 1 and, in use, horizontal and orthogonal to the axis X; and a vertical axis Z integral to the vehicle 1 and, in use, vertical and orthogonal to the axes X, Y.

The road vehicle 1 comprises a vehicular frame 8, which supports the body 5.

Furthermore, the road vehicle 1 comprises a vehicular battery pack 9 fitted to the frame 8 and preferably arranged so as to define at least part of a floorboard 10 of the road vehicle 1.

Figure 2:
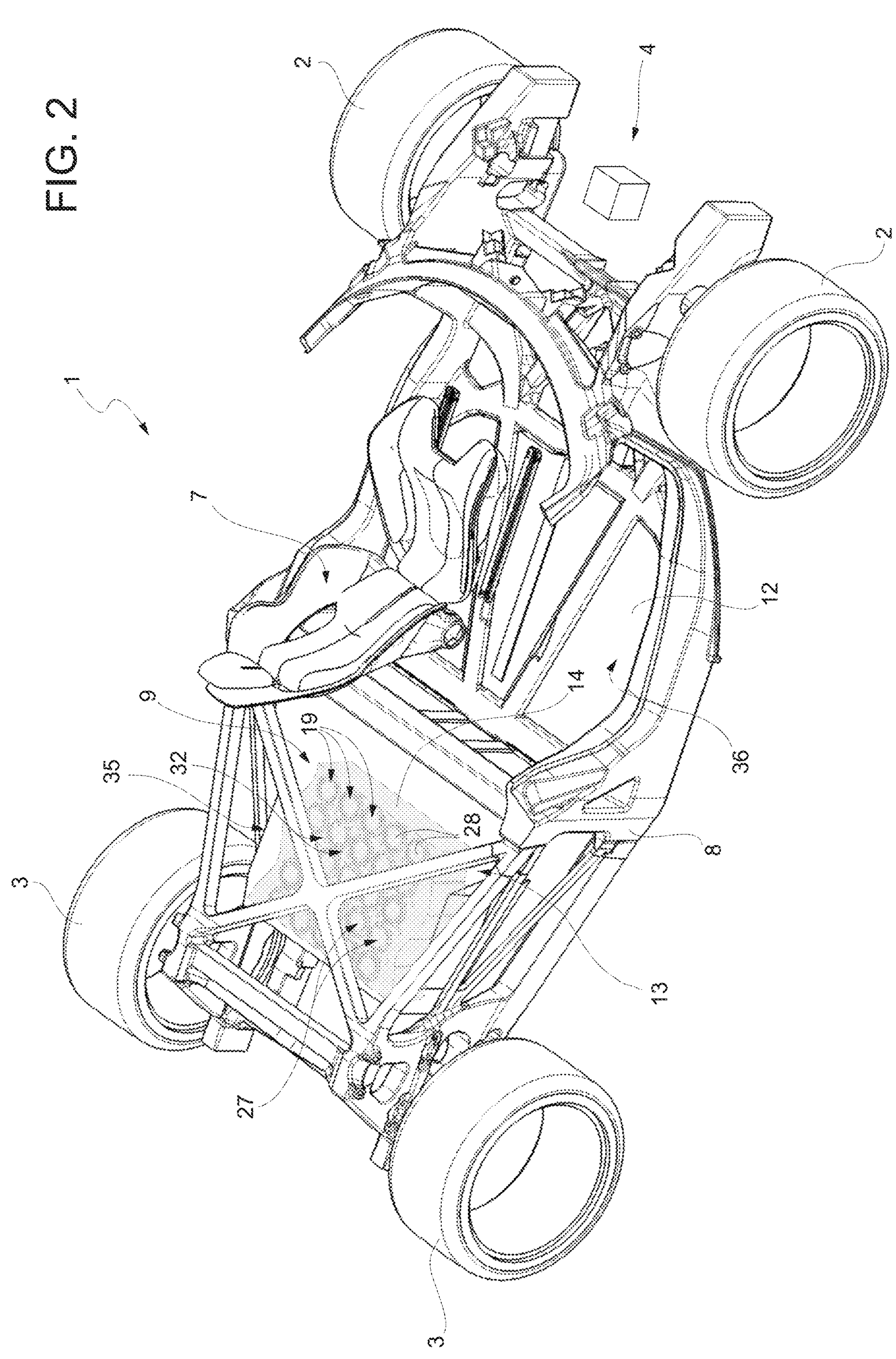
FIG. 2 is a schematic perspective view, with details left out for greater clarity, of an inner structure of the road vehicle of FIG. 1, showing the inside of the battery pack.

In the non-limiting embodiments of FIGS. 1 and 2, the vehicular battery pack 9 comprises a support structure 11 extending along the vehicular longitudinal axis X and comprising a floor 12, which at least partly defines the floorboard 10 of the road vehicle 1.

Advantageously, though not in a limiting manner, the floor 12 substantially extends between a front axle (which is known and is not shown herein) and a rear axle (which is also known and is not shown herein) of the road vehicle 1.

As shown in the non-limiting embodiment of FIG. 1, the floor 12 has a sheet-like shape (namely, it is shaped like a slab, with a thickness that is significantly smaller than the other two dimensions).

In particular, the support structure 11 defines, on the inside, a housing 13, which is delimited by the floor 12 at the bottom.

Unlike prior art documents, as explained more in detail below, the battery 9 does not consist of modules comprising a plurality of independent cells, formed and operating singularly. In particular, the battery pack 9 does not comprise single outer containers, such as cans or pouches, which normally delimit the active materials (electrodes, separator, electrolyte) of an electrochemical cell.

The battery pack 9 advantageously comprises a three-dimensional substrate 14, which is arranged inside the housing 13; in particular it is supported by, hence is arranged above, the floor 12.

The three-dimensional substrate 14 preferably has a prismatic structure, in particular a parallelepiped-like or anyway an extruded structure, comprising a first outer surface 15 and a second outer surface 16 opposite the first outer surface 15

In particular, the first outer surface 15 and the second outer surface 16 are parallel to one another.

Figure 3:
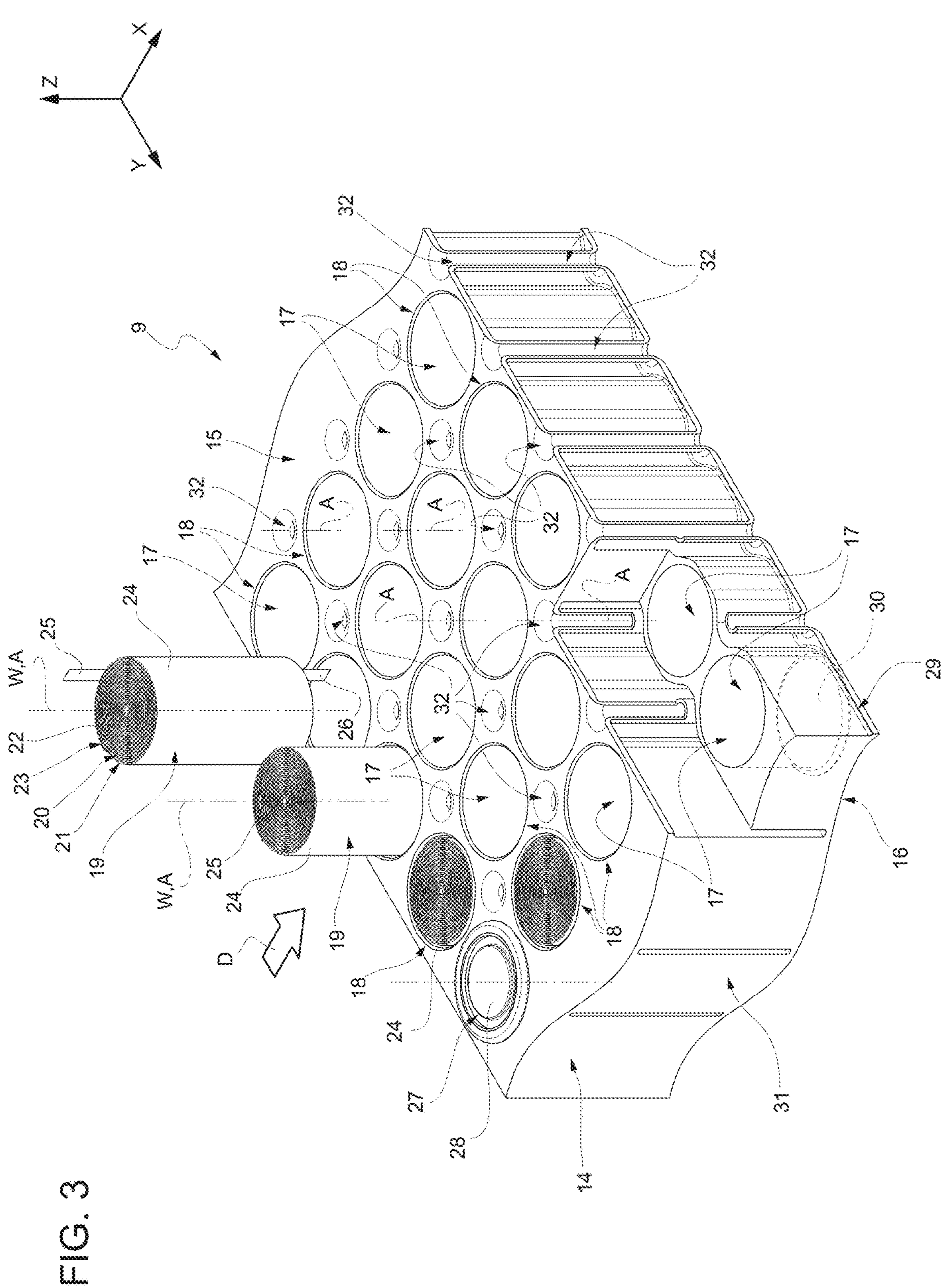
FIG. 3 is a schematic perspective view, with details left out for greater clarity, showing different steps of a method according to the invention for manufacturing a first embodiment of the battery pack of FIG. 2.

In some non-limiting cases, like the one shown in FIGS. 2 and 3, the first outer surface 15 and the second outer surface 16 are also parallel to the floor 12.

Figure 4:
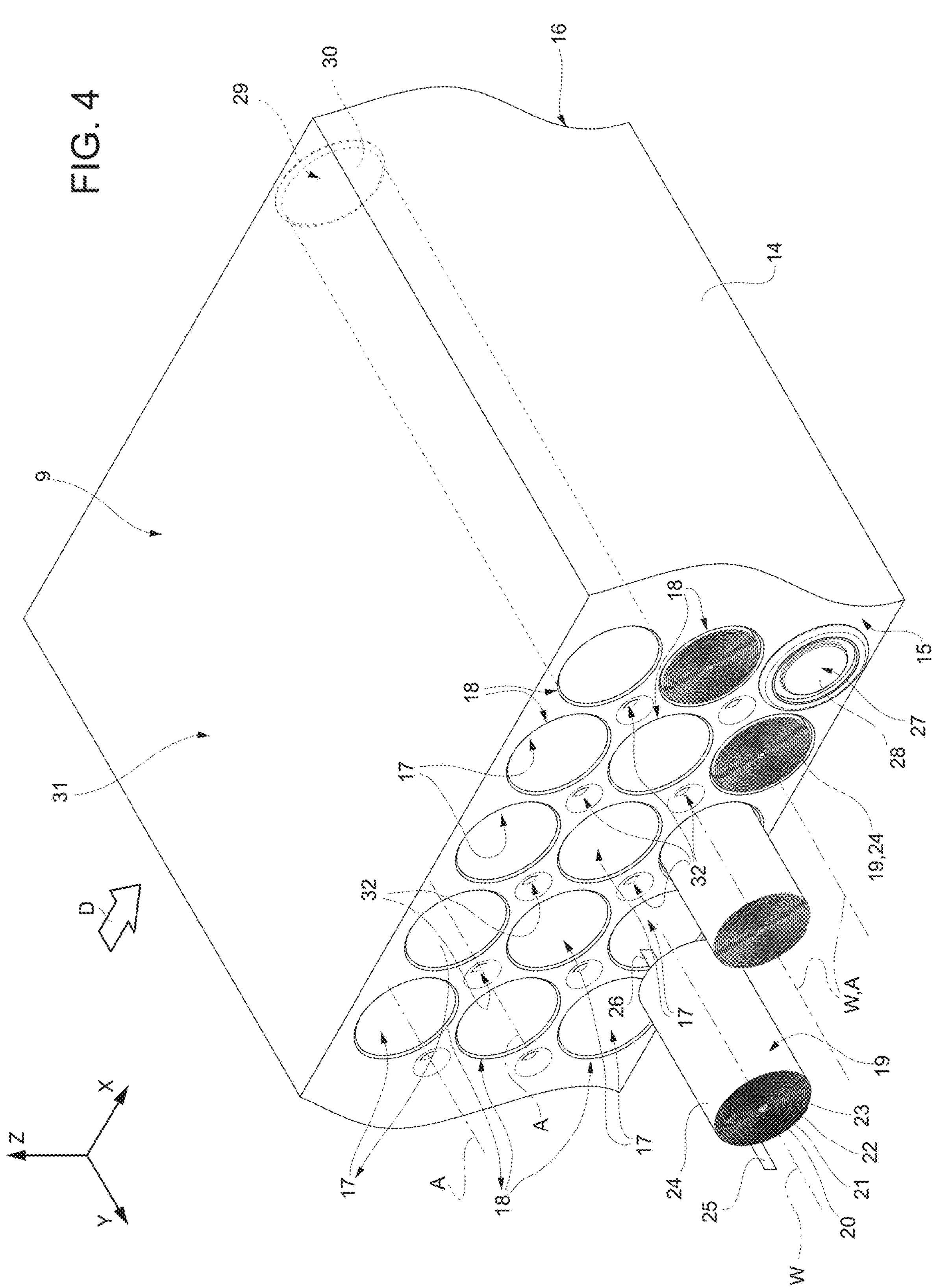
FIG. 4 is a schematic perspective view, with details left out for greater clarity, showing different steps of a method according to the invention for manufacturing a second embodiment of the battery pack.

In other non-limiting cases, like the one shown in FIG. 4, the first outer surface 15 and the second outer surface 16 are transverse, in particular perpendicular to the floor 12.

Furthermore, the three-dimensional substrate 14 is provided with a plurality of seats 17, which extend inside the substrate 14 along a longitudinal axis A from an opening 18 of the first outer surface of the substrate 14.

The battery pack 9 advantageously comprises a plurality of active primary units 19 (of the type used, for example, for the formation of known electrochemical cells).

In detail, the cylindrical electrochemical primary units 19 are of the known kind, for example with lithium ions, and will not be described in detail below, for they are manufactured with known methods.

Each primary unit comprises a plurality of active materials, among which there are at least a first electrode 20 (for example, an anode or a cathode), a first separator 21 (of the known kind and not described in detail below, for example a polymer, ceramic, etc. separator), a second electrode 22 (for example, a cathode or an anode) and a second separator 23 (of the same kind as the first separator 21).

In some non-limiting cases, the active materials are staggered relative to one another and are piled up so as to form a stack (of the kind used for assembling prismatic or pouch cells).

In other cases, like the ones shown in the non-limiting embodiments of FIGS. 2 to 4, the active materials are wound around a winding axis W so as to form a winding 24 (of the kind used for assembling cylindrical cells).

In particular, each primary unit comprises a first terminal 25 connected to the first electrode 20 and a second terminal 26 connected to the second electrode 22.

As shown in the non-limiting embodiment of FIGS. 2 to 4, each primary unit 19 is entirely inserted in a respective seat 17 of the plurality of seats 17 of the support substrate 14. In particular, each seat 17 has a shape that is complementary to the one of each primary unit 19.

For example, in the embodiments of FIGS. 3 and 4, the primary units 17 are cylindrical windings 24; therefore, the seats 17 are cylindrical cavities, namely holes with a circular section.

In other non limiting embodiment which are nor shown herein, the primary units 17 are stacks; therefore, the seats 17 are prismatic cavities, namely oblong slots where to insert the stacks.

Furthermore, the battery pack advantageously comprises a first closure assembly 27, which closes the plurality of primary units 19 inside the respective seats 17.

According to some preferred, though non-limiting embodiments, like the one shown in FIGS. 3 and 4, the closure assembly 27 comprises a plurality of first closure elements 28, which are electrically conductive and are each arranged in the area of a respective opening 18.

The closure elements 28 preferably are independent of one another for each seat 17. In other words, each seat 17 is provided with a respective closure element 28.

In particular, the closure elements 28 are metal caps 29, preferably with the shape of a disc, defining one of the cylindrical bases of the seat 17, in the case of the windings 24 shown in FIGS. 3 and 4.

In detail, the first terminal 25 is electrically in contact with the respective first closure element 28 of the respective seat 17. In this way, the closure element 28 itself becomes the first terminal 25.

The first terminal 25 is of the known kind and can be defined by a tab, a bare foil (for example, copper or aluminium) or by a plurality of tabs pressed towards the centre (also known as tables structure).

Hence, in particular, the three-dimensional substrate 14 defines the inner structure of the battery pack 9, constituting the interstitial portion between the primary units 19.

According to some non-limiting embodiments, in case a watery or anyway liquid electrolyte is used for the formation of the battery pack 9, each seat 17 is filled with an electrolyte before or, preferably, after the primary unit 19 is inserted into it. In particular, the quantity of electrolyte inserted into a seat 17 is such as to completely fill the seat 17 with the respective primary unit 19 inside it.

According to other non-limiting embodiments, each primary unit 19 comprises a non-watery, gel polymer electrolyte, which permeates the first separator 21 and the second separator 23 (hence, for example, already part of the winding 24 between the two electrodes 20 and 22).

In some non-limiting cases, the substrate 14 is made of an electrically conductive material, for example metal (steel or, preferably, aluminium). In particular, the second terminal 26 of each one of the primary units 19 is electrically con contact with the substrate 14, thus making it a terminal 26 itself. Therefore, in these embodiments, each first closure element 28 has to be electrically insulated from the substrate 14 because otherwise the batter pack 9 would short-circuit.

In other preferred non-limiting cases, the substrate 14 is made of an electrically insulating material (for example, resin).

Advantageously, though not in a limiting manner, each opening 18 is a through opening extending from the first outer surface 15 to the second outer surface 16 of the substrate 14 opposite the first outer surface 15.

In these embodiments, the battery pack 9 preferably comprises, furthermore, a second closure assembly 29, which closes the plurality of primary units 19 inside the respective seats 17 on the side of the second outer surface 16. In particular, the second closure assembly 29 comprises a plurality of second closure elements 30, which are electrically conductive and are each arranged in the area of a respective seat 17. More precisely, the second terminal 26 is electrically in contact with the respective second closure element 30 of the respective seat 17.

Preferably, though not in a limiting manner, the second closure elements 30 are of the same kind as the first closure elements 28.

According to some preferred, though non-limiting embodiments, the support substrate 14 is manufactured by means of additive manufacturing techniques, such as for example stereolithography, fused deposition modelling or selective laser sintering (used selectively depending on the material used for the substrate 14). In this way, the customization of the shape of the battery pack 9 is improved for each model of road vehicle 1. Furthermore, additive manufacturing allows for the creation of a substrate 14 provided with an net-like interstitial section, between one seat and the other, thus lightening the battery pack and improving the elasticity thereof at the same time.

According to other non-limiting embodiments, the support substrate is manufactured by means of traditional subtractive manufacturing methods (by means of presses, milling machines or lathes) with casting of molten material into suitable dies.

In some non-limiting cases, which are not shown herein, the seat has such a length, along the longitudinal axis A, that it can accommodate more the one primary unit 19. For example, in case of windings 24, the seat has such a length, along the longitudinal axis A, that several windings 24 can be placed (in series) inside a same seat 17.

According to some preferred, though non-limiting embodiments, like the ones shown in FIGS. 3 and 4, the substrate 14 has a prismatic shape, namely a shape having two opposite bases spaced apart from one another by the volume of the substrate 14 itself. In particular, at least a lower base of the substrate 14, namely the one in contact with the floor 12, has a shape such as to fill the floor 12 of the battery pack 9 as much as possible.

In particular, as shown in the non-limiting embodiments of the accompanying drawings, the assembly made up of the substrate 14, the first closure assembly 27 (if necessary, the second closure assembly 29) and the primary units 19 defines a layer 31 of cells.

Hence, in particular, unlike the prior art, the battery pack 9 does not comprise singularly movable electrochemical cells, but the three-dimensional substrate 14 supports the primary units 19 and the closure assemblies 27 and 29, without the interposition of further (metal) casings that generate unnecessary volumes. In particular, in this way, the primary units 19 can be brought closer to one another, since they are normally separated by a double thickness due to the cans or the pouches that singularly surround them. On the contrary, the battery pack 9 has one single separating layer between adjacent primary units 19, thus optimizing the spaces available inside the battery pack 9, which can accommodate a larger number of primary units 19 in the same volume.

According to some non-limiting cases, like the one shown in FIG. 1, the battery pack 9 comprises a plurality of layers 31 of cells on top of one another (for example, in the case of the embodiment of FIG. 3) or next to one another (for example, in the case of the embodiment of FIG. 4).

Advantageously, though not in a limiting manner, and as shown in the embodiments of FIGS. 2 to 4, in order to optimize spaces, the seats 17 are arranged along parallel longitudinal axes A.

In particular, in the non-limiting embodiment of FIG. 3, the parallel longitudinal axes A are, in turn, perpendicular to the floor 12 (whether it is perfectly parallel to the ground or slightly inclined). More in particular, the parallel longitudinal axes A are parallel to the vertical axis Z (or at most at a 10° angle, preferably at most at a 5° angle relative to the latter).

In particular, in the non-limiting embodiment of FIG. 4, the parallel longitudinal axes A are, in turn, parallel to the floor 12 (whether it is perfectly parallel to the ground or slightly inclined). More in particular, the parallel longitudinal axes A are parallel to the transverse axis Y.

Advantageously, though not in a limiting manner, the battery pack 9 further comprises refrigeration channels 32 parallel to the longitudinal axes A of the seats 17 and interposed between the seats 17. Hence, in other words, the refrigeration channels 32 are obtained in the substrate 14, in particular in the separation zone between the primary units 19. In this way, the cooling of the active parts of the battery pack is improved 9, since the casings of the single cells no longer need to be cooled.

In particular, the primary units 19 of the battery pack are electrically connected to one another through the interconnection of the closure elements 28, 30 (if present) and, if necessary, of the substrate 14, if it is electrically conductive.

In the non-limiting embodiment of FIG. 4, the horizontal arrangement of the primary units 19 allows the three-dimensional substrate 14 to also adjust to a curved shape of the floor 12 of the battery pack 9.

In the non-limiting embodiment of FIG. 1, the floor 12 comprises, along the longitudinal axis X, a front portion 33 substantially parallel to the ground G and a rear portion 34 diverging from the ground G.

According to some preferred, though non-limiting embodiments, like the one shown in the accompanying drawings, the primary units of a same layer 31 of cells are arranged so as to form a quincux formation. In other words, the seats 17 are staggered so as to maximize the quantity of primary units 19 in the same volume.

Preferably, as shown in the non-limiting embodiment of FIG. 3, the battery pack 9 comprises a verticalized portion 35 supported by the rear portion 34 and having a greater thickness than the rest of the battery pack 9. In particular, the verticalized portion 35 comprises at least two, in particular at least three layers 31 of cells on top of one another (or next to one another, in case configuration according to the embodiment of FIG. 4 is used).

Advantageously, though not necessarily, the battery pack 9 further comprises a lowered portion 36 supported by the front portion 33 and having a smaller thickness than the verticalized portion 35.

In particular, in the lowered portion 36 there is only one layer of cells 31, preferably with the primary units 19 arranged with the longitudinal axis A horizontal.

Advantageously, though not in a limiting manner, the battery pack 9 is arranged at the bottom of the passenger compartment 6. In particular, the front portion 33 is arranged under the cockpit 7 and the possible passenger's seat beside it, whereas the rear portion 34 is arranged behind the seats contained inside the passenger compartment 6.

In particular, the battery pack 9 is suited to be connected to the powertrain system 4 of the at least partially electric vehicle 1 and is designed to store the power produced by an electric machine (which is not shown herein). The battery pack 9 is connected to the electric machine through the interposition of a power converter (commonly known as inverter), which, based on the different needs of the electric machine and of the battery pack 9, transforms the direct current outputted by the battery pack 9 into alternating current for the electric machine and vice versa.

The battery pack 9 comprises at least one section configured to house a battery management system-BMS designed to control the operating parameters of the primary units 19 by measuring a plurality of parameters relating to the first terminal 25 and/or to the second terminal 26, which are connected to general terminals of the battery pack 9 with a known BUS connection.

According to a further aspect of the invention, there is provided a method for assembling a vehicular battery pack 9.

The method comprises the steps of providing, for example conveying along a production line, the support structure 11 and of placing the substrate 14 inside the housing.

The method further comprises the step of providing, hence conveying, for example to a store, a plurality of active primary units 19 (for example cylindrical windings 14 or planar stacks).

In addition, the method comprises the step of entirely inserting, preferably by means of a robotic manipulator, each primary unit 19 into a respective seat 17. In particular, the insertion has to be carried out with precision in order not to damage the primary units 19, since each seat 17 has a shape that is complementary to the one of each primary unit 19.

Furthermore, the method advantageously comprises the step of closing said plurality of seats 17, each accommodating, on the inside, at least one respective primary unit 19, by means at least of the first closure assembly 27 (or, if necessary, in combination with the second closure assembly 29), which closes said plurality of primary units 19 inside the respective seats 17. In particular, the method comprise closing the first closure elements 28 and, if necessary, the second closure elements 30 one by one or in groups.

In particular the method further comprises the step of placing, prior to or concurrently with the closing step, the first terminal 25 electrically in contact with the respective first closure element 28 of the respective seat 17.

Advantageously, though not in a limiting manner, in case there is the second closure assembly 29, it is placed on the substrate 14 so as to close/seal the seats 17 on the side of the second surface 16. In particular, this step takes place before the seats 17 are filled with the primary units 19.

According to some preferred non-limiting embodiments, the method comprises the prior step of manufacturing the substrate 14 by means of additive manufacturing techniques of the kind described above or by means of casting into dies or subtractive manufacturing.

In particular, in case the primary units 19 are not of the so-called solid state (SS) kind, the method comprises the step of filling, before or preferably after the insertion of the primary units 19 into the respective seats 17, said plurality of seats 17 with an electrolyte. More in particular, the introduced quantity of electrolyte is sufficient to drown the plurality of primary units 19 and eliminate air from within the seats 19 before the step of closing with the first closure assembly 27.

Preferably, though not in a limiting manner, the method comprises the further step of placing several layers 31 of cells, on top of or next to one another, on the floor 12 of the battery pack 9.

Advantageously, though not in a limiting manner, during the further placing step, the verticalized portion 35 is formed, which is supported by the rear portion 34 and has a greater thickness than the rest of the battery pack 9. In particular, in the verticalized portion 35 there are at least two, in particular at least three layers 31 on top of one another (in particular, horizontal layers).

Finally, not in a limiting manner, the method comprises the step of forming the battery pack 9 carrying out charging/discharging cycles, which merge those that are normally carried out for the single electrochemical cells making up prior art battery packs.

Even though the invention described above specifically relates to some precise embodiments, it should not be considered as limited to said embodiments, for its scope of protection also includes all those variants, changes or simplifications covered by the appended claims, such as for example a different shape of the battery pack, a different location thereof, a different type of materials, etc.

The invention offers many advantages.

First of all, it eliminates the metal containers of the single electrochemical cells, which determine an undesired increase in weight and dimensions.

Furthermore, as a consequence of said improved use of the space, more primary unit can be inserted in the same volume.

A further advantage of the invention lies in the possibility of customizing each battery pack so as to fill as much volume as possible in the vehicular floorboard, thus generating not necessarily rectangular shapes.

Furthermore, the use of additive techniques improves the elasticity and increases the lightness of the battery pack.

In addition, there are a plurality of refrigeration channels, which are directly integrated in the substrate and ensure an optimized cooling efficiency.

Finally, thanks to the invention, the geometric limits to which state-of-the-art battery packs are currently subjected can be overcome, thus freeing designers from the idea of a battery pack consisting of single units that have to be coupled to maximize the capacity thereof.

LIST OF THE REFERENCE NUMBERS OF THE FIGURES

1 vehicle
2 wheels
3 wheels
4 powertrain system
5 body
6 passenger compartment
7 cockpit
8 frame
9 battery pack
floorboard
11 support structure
12 floor
13 housing
14 substrate
first outer surface
16 second outer surface
17 seats
18 opening
19 primary units
first electrode
21 first separator
22 second electrode
23 second separator
24 winding
first terminal
26 second terminal
27 first closure assembly
28 first closure elements
29 second closure assembly
30 second closure elements
31 layer of cells
32 refrigeration channels
33 front portion
34 rear portion
35 verticalized portion
36 lowered portion
A longitudinal axis
D direction
G ground
W winding axis
X axis
Y axis
Z axis

The invention claimed is:

1. A vehicular battery pack (9) comprising:

a support structure (11) extending along a vehicular axis (X), defining within it a housing (13);

a three-dimensional substrate (14) disposed within the housing (13) and provided with a plurality of seats (17), each extending internally to the substrate (14) along an axis (A) longitudinally from an opening (18) of a first surface (15) external to the substrate (14);

a plurality of active primary units (19); each primary unit (19) comprising at least a first electrode (20), a first separator (21), a second electrode (22) and a second separator (23), arranged alternated each other and stacked together to form a stack or wound to form a winding (24); each primary unit (19) comprising a first terminal (25) connected to the first electrode (20) and a second terminal (26) connected to the second electrode (22);

wherein each primary unit (19) is entirely inserted into a respective seat (17) of the plurality of seats (17) of the substrate (14); wherein each seat (17) has a shape complementary to that of each primary unit (19);

the battery pack (9) further comprising a first closure assembly (27), which closes a plurality of primary units (19) inside the respective seats (17); wherein the closure assembly comprises a plurality of first closure elements (28) each electrically conductive and arranged at a respective opening (18);

wherein the first terminal (25) is electrically in contact with the respective first closure element of the respective housing (17).

2. The battery pack (9) according to claim 1, wherein each primary unit (19) is immersed in an electrolyte in the respective seat (17).

3. The battery pack (9) according to claim 1, wherein each primary unit (19) comprises a non-aqueous polymeric gel electrolyte, which permeates the first separator (21) and the second separator (23).

4. The battery pack (9) according to claim 1, wherein the substrate (14) is made of an electrically conductive material; wherein the second terminal (26) is electrically in contact with the substrate (14) making it itself the second terminal (26); wherein each first closure element is electrically insulated from the substrate (14).

5. The battery pack (9) according to claim 1, wherein the substrate (14) is made of an electrically insulating material;

wherein each opening (18) is a through opening (18) extending from the first outer surface (15) to a second outer surface (16) of the substrate (14) opposite the first outer surface (15);

wherein the battery pack (9) further comprises a second closure assembly (30), which encloses the plurality of primary units (19) within respective housings (17) on the side of the second outer surface (16); wherein the second closure assembly (30) comprises a plurality of second electrically conductive closure elements (30) each disposed at a respective housing (17);

wherein the second terminal (26) is electrically in contact with the respective second closure element of the respective seat (17).

6. The battery pack (9) according to claim 1, wherein the substrate (14) is made by additive manufacturing techniques.

7. The battery pack (9) according to claim 1, wherein multiple windings may be arranged in series within a single seat (17).

8. The battery pack (9) according to claim 1, wherein the substrate (14) has a prismatic shape; wherein the assembly comprising the substrate (14) with the first closure assembly (27) and the primary units (19) defines a layer (31) of cells.

9. The battery pack (9) according to claim 8 and comprising a plurality of overlapping or side-by-side layers (31) of cells.

10. The battery pack (9) according to claim 1, wherein the seats (17) are arranged along parallel longitudinal axes, the battery pack (9) further comprising refrigeration channels (32) parallel to the longitudinal axes of the seats (17) and interposed between the seats (17) themselves.

11. Electric or hybrid road vehicle (1) comprising:

four wheels (2, 3), of which at least one pair of wheels (2, 3) is driven;

a passenger compartment (6);

a power train system (4) configured to control the motion of the driving wheels (2, 3);

a battery pack (9) according to claim 1.

12. The road vehicle (1) according to claim 11, wherein the battery pack (9) is mounted to a frame (8) of the road vehicle (1) and is arranged to define at least part of a floor pan (10) of the road vehicle (1).

13. Method of assembling a vehicle battery pack (9) comprising the steps of:

providing a substrate (14) with a plurality of seats (17), each extending along a longitudinal axis (A) from an opening (18) of a first surface (15) on the outside of the substrate (14) towards the inside of the substrate (14) itself;

providing a plurality of active primary units (19); each primary unit (19) comprising at least a first electrode (20), a first separator (21), a second electrode (22) and a second separator (23), arranged alternated each other and stacked together to form a stack or coiled to form a coil (24); each primary unit (19) comprising a first terminal (25) connected to the first electrode (20) and a second terminal (26) connected to the second electrode (22);

inserting each primary unit (19) entirely within a respective seat (17) of the plurality of seats (17) of the substrate (14); wherein each seat (17) has a shape complementary to that of each primary unit (19);

closing the plurality of seats (17) with within, each, at least one respective primary unit (19) by means of at least one first closure assembly (27), which comprises the plurality of primary units (19) within the respective seat (17); wherein the closure assembly comprises a plurality of electrically conductive first closure elements (28) each arranged at a respective seat (17);

arranging, prior to or concurrently with the step of closing, the first terminal (25) electrically in contact with the respective first closure element of the respective seat (17).

14. The method according to claim 13 and comprising the further step of making the substrate (14) by means of additive manufacturing techniques, printing or casting.

15. The method according to claim 13 and comprising the step of filling, before or after inserting the primary units (19) into the respective seat (17), the plurality of seats (17) with electrolyte; wherein the amount of electrolyte injected is sufficient to drown the plurality of primary units (19) and eliminate air from within the housings (17).

* * * * *